(12) United States Patent  (10) Patent No.: US 8,127,154 B2
Elnozahy  (45) Date of Patent: Feb. 28, 2012

(54) TOTAL COST BASED CHECKPOINT SELECTION

(75) Inventor: Elmootazbellah N Elnozahy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 705 days.

(21) Appl. No.: 12/244,261

(22) Filed: Oct. 2, 2008

(65) Prior Publication Data

US 2010/0088494 A1   Apr. 8, 2010

(51) Int. Cl.
G06F 1/00 (2006.01)
G06F 11/00 (2006.01)
G06F 7/00 (2006.01)
G01R 11/56 (2006.01)

(52) U.S. Cl. ......... 713/300; 714/15; 705/412; 707/640
(58) Field of Classification Search .......... 713/300, 713/310, 321; 714/1, 15; 718/102; 705/400, 705/412; 707/640, 646, 649, 653
See application file for complete search history.

(56) References Cited

U.S. PATENT DOCUMENTS

| | | | | |
|---|---|---|---|---|
| 5,551,043 A * | 8/1996 | Crump et al. | | 713/323 |
| 5,560,023 A * | 9/1996 | Crump et al. | | 713/323 |
| 6,718,538 B1 * | 4/2004 | Mathiske | | 717/129 |
| 7,165,186 B1 * | 1/2007 | Viswanatham et al. | | 714/1 |
| 2005/0228836 A1 * | 10/2005 | Bacastow et al. | | 707/204 |
| 2007/0078910 A1 * | 4/2007 | Bopardikar | | 707/204 |
| 2007/0220327 A1 * | 9/2007 | Ruscio et al. | | 714/17 |
| 2007/0282929 A1 * | 12/2007 | Kobayashi et al. | | 707/204 |
| 2008/0243959 A1 * | 10/2008 | Bacastow et al. | | 707/204 |
| 2009/0055520 A1 * | 2/2009 | Tabata et al. | | 709/223 |
| 2010/0010857 A1 * | 1/2010 | Fadell | | 705/8 |
| 2010/0030791 A1 * | 2/2010 | Iverson et al. | | 707/10 |
| 2010/0058012 A1 * | 3/2010 | Okada et al. | | 711/162 |

* cited by examiner

*Primary Examiner* — Khanh Dang
(74) *Attorney, Agent, or Firm* — Garg Law Firm, PLLC; Rakesh Garg; Libby Z. Roub

(57) ABSTRACT

A cost associated with taking a checkpoint is determined. The cost includes an energy cost. An interval between checkpoints is computed so as to minimize the cost. An instruction is sent to schedule the checkpoints at the computed interval. The energy cost may further include a cost of energy consumed in collecting and saving data at a checkpoint, a cost of energy consumed in re-computing a computation lost due to a failure after taking the checkpoint, or a combination thereof. The cost may further include, converted to a cost equivalent, administration time consumed in recovering from a checkpoint, computing resources expended in taking a checkpoint, computing resources expended after a failure in restoring information from a checkpoint, performance degradation of an application while taking a checkpoint, or a combination thereof.

20 Claims, 4 Drawing Sheets

TOTAL COST BASED CHECKPOINT SELECTION

BACKGROUND OF THE INVENTION

1. Field of the Invention

The present invention relates generally to an improved data processing system, and in particular, to a computer implemented method for improving failure tolerance in data processing systems. Still more particularly, the present invention relates to a computer implemented method, system, and computer usable program code for total cost based checkpoint selection.

2. Description of the Related Art

When a failure occurs in a data processing system, it is desirable to reinitiate the data processing system from a known time of operation in the past. As a part of reinitiating the data processing system, data, processes, application statuses, and other information is restored to the known time in the past and the system operation recovered from that point in time. The known time is called a checkpoint. In other words, a checkpoint is a view of the data, processes, application statuses, and information in a data processing system at some time in the past.

In order to be able to accomplish a recovery operation from a checkpoint, the data, states, and other information existing in the data processing system at the checkpoint are saved to a highly available data storage system that can withstand failures, herein called stable storage. Such data, states, and other information at a checkpoint are collectively called checkpoint data.

Typically, checkpoint data is collected and saved at a number of checkpoints as a data processing system operates. In case of a data processing system failure, a user or the system restores the data processing system operation from the most recent saved checkpoint by repopulating the data processing system with the checkpoint data.

A user or the system may determine how often the checkpoints occur during a data processing system's operation. When a new checkpoint is successfully saved, previous checkpoints can be purged to reduce the space needed on stable storage.

An inverse relationship exists between the frequency of taking the checkpoints and the amount of rework a data processing system has to perform to compute again up to the point the failure occurred. The less frequently the checkpoints are taken, the higher the likelihood that the checkpoint is farther back in the past from the point of failure, and the more rework the data processing system has to perform to re-compute up to the time the failure occurred. The more frequently the checkpoints are taken, the higher the likelihood that the checkpoint is closer to the time of failure, and the lesser the work and resources have to be expended to restore operation and recover the data processing system to the time of failure.

SUMMARY OF THE INVENTION

The illustrative embodiments provide a method, system, and computer usable program product for total cost based checkpoint selection. A cost associated with taking a checkpoint is determined. The cost includes an energy cost. An interval between checkpoints is computed so as to minimize the cost. An instruction is sent to schedule the checkpoints at the computed interval.

The energy cost may further include a cost of energy consumed in collecting and saving data at a checkpoint, a cost of energy consumed in re-computing a computation lost due to a failure after taking the checkpoint, or a combination thereof. The cost may further include an amount of administrator time consumed in recovering from a checkpoint converted to a cost equivalent, an amount of computing resources expended in taking a checkpoint converted to a cost equivalent, an amount of computing resources expended after a failure in restoring information from a checkpoint, a performance degradation in the performance of an application while collecting and checkpoint saving checkpoint data converted to a cost equivalent, or a combination thereof.

The cost may include several factors. The computing may use an optimization algorithm configured to minimize a factor in the plurality of factors.

Furthermore, the cost may change based on location, time of day, day of the year, a type of application executing at a time of failure, or a combination thereof. The interval may be re-computed in response to a change in the cost. The change in the cost may be a change in the energy cost, an administration cost, an amortized cost of a data processing system, an opportunity cost, or a combination thereof.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
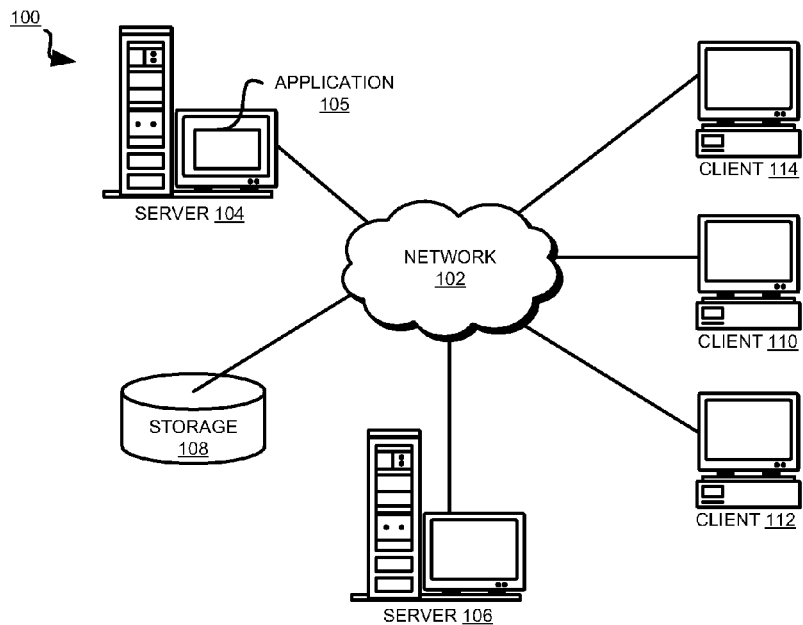
FIG. 1 depicts a pictorial representation of a network of data processing systems in which illustrative embodiments may be implemented.

The process of collecting and saving checkpoint data is called taking a checkpoint. The illustrative embodiments recognize that collecting checkpoint data is a resource intensive process. Taking a checkpoint slows the system down as it consumes processor cycles, storage space, network bandwidth, user time, and additional workload on the data processing system.

In addition, the illustrative embodiments recognize that taking a checkpoint consumes electrical energy. Taking checkpoints increases the energy consumption of the data processing system. Often, users select checkpoints, to wit, decide to take checkpoints, at arbitrary fixed intervals. In some cases, the interval between checkpoints follows some computation based on mean time between failures (MTBF). The illustrative embodiments recognize that in either approach, the consumption of electrical energy and optimizing that consumption is not a factor. Optimum consumption of energy for taking a checkpoint is a level of consumption at a certain interval between checkpoints such that if the interval between checkpoints is increased or decreased from the certain interval, the total energy consumption for taking the checkpoint and recovery from that checkpoint will be more than that level.

The illustrative embodiments recognize that a failure wastes the energy that has been expended to perform the work that was lost due to the failure. The rework itself consumes electrical energy. The energy consumed in this rework is called the energy at risk. Energy at risk can be reduced by taking frequent checkpoints. However, the illustrative embodiments recognize that frequent checkpoints consume proportionally more energy, which is effectively an amount of energy wasted during the checkpoint taking.

The illustrative embodiments recognize that energy management can be an important factor in a variety of data processing environments. For example, data centers may be charged more for the electrical power they draw during peak consumption hours, typically during the daytime, and less during the off peak hours, typically during the night. Thus, the cost of energy at risk and the amount of energy wasted due to checkpoints may be variable. Furthermore, taking checkpoints without consideration to energy consumption may unnecessarily incur additional cost to the operation of the data center.

The illustrative embodiments incorporate the variable cost of energy as a part of the tradeoff in determining the frequency of taking checkpoints. For example, in some embodiments, the cost of taking checkpoints—the cost factor—may be restricted to only the energy cost. In other embodiments, this cost factor may be a more generalized cost function to take into account not only the energy cost, but also the amortized cost of the data processing system installation, administrator time, and any other implementation specific costs.

For example, the cost factor according to the illustrative embodiments can include an opportunity cost that may be assigned to an application according to its importance. The administrator time could also be variable, for example, administration costs could be higher during the third shift as compared to the first or the second shifts.

Thus, the illustrative embodiments provide that a combination of the energy cost, the amortized data processing system cost, any application opportunity cost, and the cost of administration can be used in computing a checkpoint frequency that may be more cost efficient as compared to the current methods of determining checkpoint frequency. When the total cost function according to the illustrative embodiments is considered together with the mean time between failures, the illustrative embodiments may enable the computation of a checkpoint frequency that minimizes the overall cost of running the application with high probability. Such a checkpoint frequency is called an optimal checkpoint frequency and can be variable during day time due to the variability in energy cost, application importance, and administrator costs.

By using the illustrative embodiments, users may be able to select checkpoints in a manner designed to optimize energy consumption and consequently improve the total cost of taking checkpoints. The users may be able to determine the total cost of selecting checkpoints at various times and assess the energy consequences of making those selections.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

The illustrative embodiments are described in some instances using particular data processing environments only as an example for the clarity of the description. The illustrative embodiments may be used in conjunction with other comparable or similarly purposed architectures for using virtualized real memory and managing virtual machines.

Figure 2:
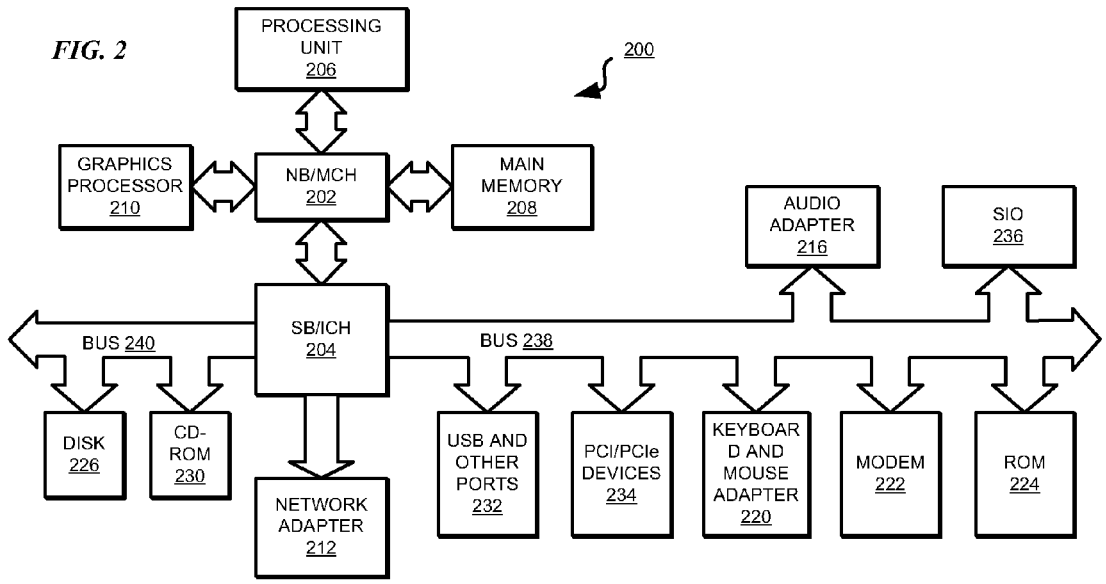
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108.

Software applications may execute on any computer in data processing environment 100. In the depicted example, server 104 includes application 105, which may be a software application that may perform the total cost based checkpoint selection.

In addition, clients 110, 112, and 114 couple to network 102. Servers 104 and 106, storage units 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
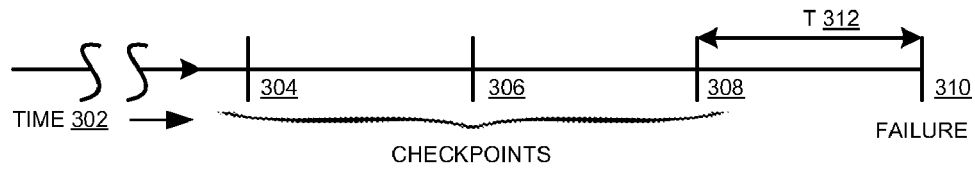
FIG. 3 depicts different timelines of checkpoints that may be modified using an illustrative embodiment.
Figure 3:
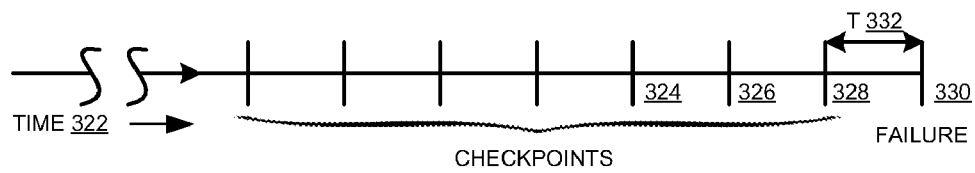

With reference to FIG. 3, this figure depicts different timelines of checkpoints that may be modified using an illustrative embodiment. Timeline 302 is shown to include markings representative of when checkpoints are taken in one configuration of a data processing system, such as system 200 in FIG. 2, or any of servers 104 or 106 or clients 110, 112, or 114 in FIG. 1. Checkpoints 304, 306, and 308 represent the time at which checkpoints were taken.

In this configuration of the data processing system, failure 310 indicates when a failure occurs in the data processing system. Time 312 labeled "T" indicates the time elapsed from the last checkpoint 308 to failure 310.

A second timeline, timeline 322 is shown to include markings representative of when checkpoints are taken in another configuration of the data processing system. Checkpoints 324, 326, and 328 represent the time at which last few checkpoints were taken in the second configuration.

In this configuration of the data processing system, failure 330 indicates when a failure occurs in the data processing system. Time 332 labeled "T" indicates the time elapsed from the last checkpoint 328 to failure 330.

Comparing timelines 302 and 322 on the same scale, checkpoints on timeline 302 are taken farther apart as compared to checkpoints taken on timeline 322. Furthermore, time 312 is longer than time 332, if the two timelines represent identical progression of events in a data processing system leading to identical failures 310 and 330 at identical times.

As noted above, the illustrative embodiments recognize that energy is expended in taking the check points as well as recovering the data processing system from the last checkpoint. FIG. 3 illustrates that on timeline 302, energy expended in taking the checkpoints may be less compared to energy expended in taking checkpoints on timeline 322. The energy expended in taking a checkpoint as depicted in FIG. 3 may be expended in increased workload on the data processing system, additional processes executing on the data processing system, and other similar reasons.

In contrast, energy expended in recovering from checkpoint 308 is more compared to energy expended in recovering from checkpoint 328. The difference in the energy expended exists because presumably fewer computations have been lost as a result of failure after a checkpoint that is closer in time to the failure.

Figure 4:
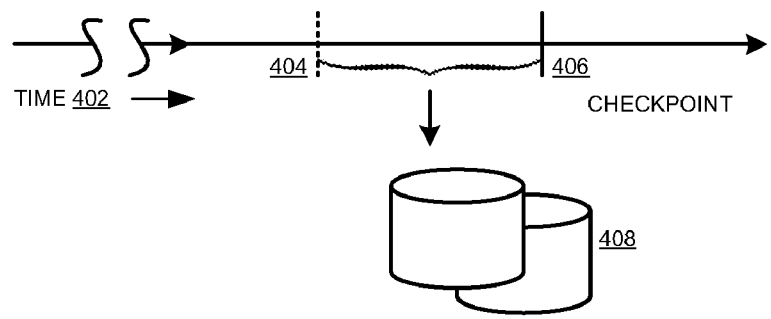
FIG. 4 depicts another timeline of taking a checkpoint that may be modified using an illustrative embodiment.

With reference to FIG. 4, this figure depicts another timeline of taking a checkpoint that may be modified using an illustrative embodiment. Timeline 402 shows marking 404 representative of when the process of taking a checkpoint begins and marking 406 representative of when the checkpoint taking is actually complete.

During the time elapsed between markings 404 and 406, the process of taking a checkpoint writes checkpoint data to data storage device 408. Energy is expended in this phase of taking a checkpoint as well. Again, the higher the number of checkpoints, the larger this energy expense is likely to be, and vice versa.

Figure 5:
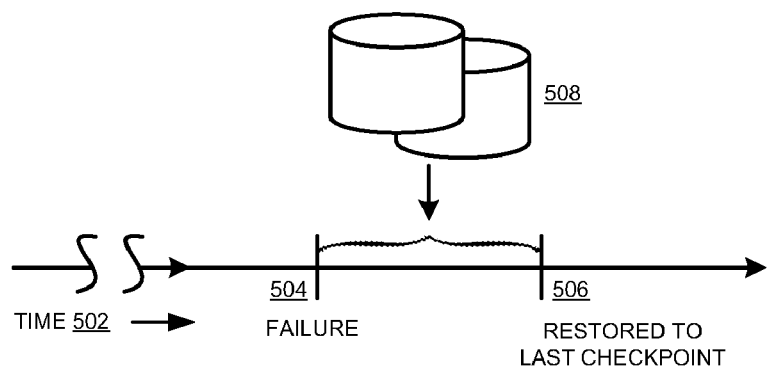
FIG. 5 depicts another timeline of recovering from a failure that may be modified using an illustrative embodiment.

With reference to FIG. 5, this figure depicts another timeline of recovering from a failure that may be modified using an illustrative embodiment. Timeline 502 shows marking 504 representative of when the failure occurs in the data processing system, and marking 506 representative of when the system is restored to the state existing at that checkpoint complete.

During the time elapsed between markings 504 and 506, the process of recovering from a failure reads checkpoint data from data storage device 508. Energy is expended in this phase of recovering from a failure and restoring operations to the last checkpoint as well. The smaller the number of checkpoints, the larger this energy expense is likely to be, and vice versa.

Figure 6:
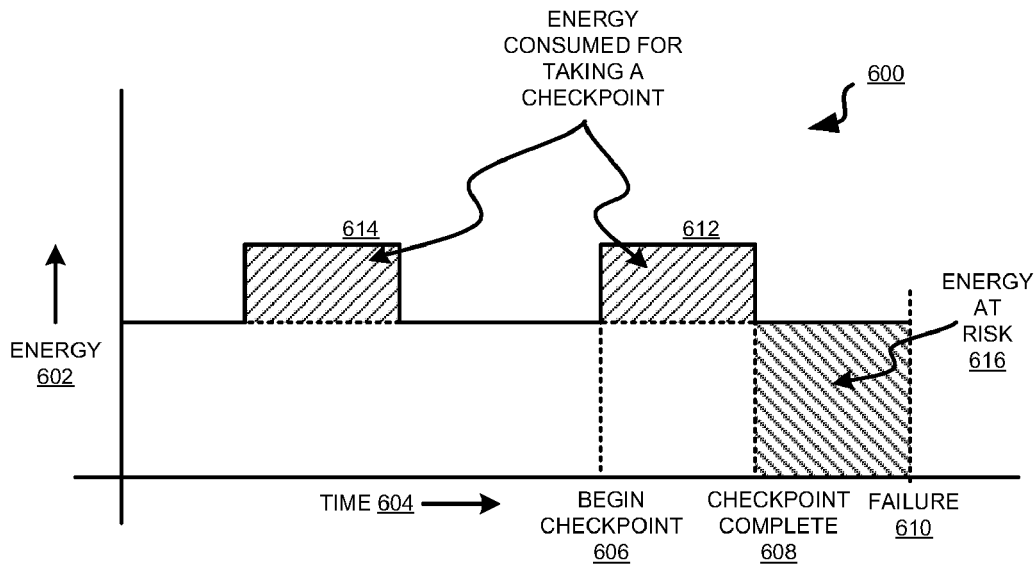
FIG. 6 depicts a graph of the energy cost of one selection of checkpoints that an illustrative embodiment may improve.

With reference to FIG. 6, this figure depicts a graph of the energy cost of one selection of checkpoints that an illustrative embodiment may improve. Graph 600 is a simplified plot of energy consumption 602 over time 604. Energy consumption according to graph 600 may result from, for example, an implementation of timeline 302 in FIG. 3.

A checkpoint taking begins at time 606 and completes at time 608. A failure occurs at time 610. Area 612 under graph 600 represents the energy consumed for taking the checkpoint between times 606 and 608. Similarly, area 614 under graph 600 is energy consumption due to an earlier checkpoint that may have been taken.

Area 616 under graph 600 represents the energy at risk from the failure. When the failure occurs at time 610, the energy expended from the time 608 till time 610 is at a risk of being lost due to the failure because a recovery from checkpoints can at most recover the data processing system to the state that existed at time 608.

Figure 7:
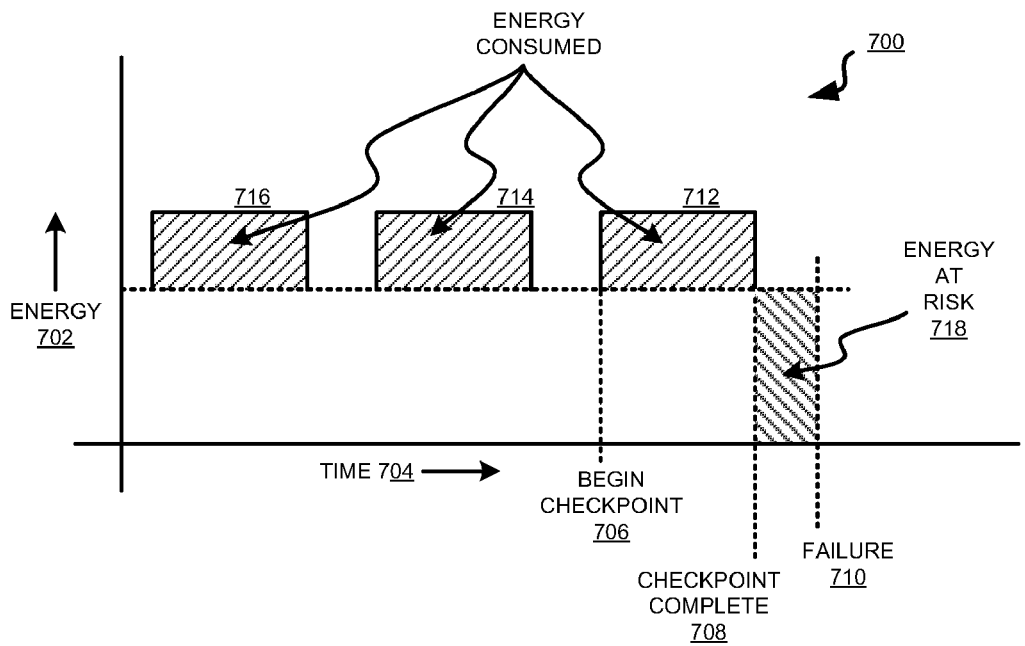
FIG. 7 depicts a graph of the energy cost of another selection of checkpoints that an illustrative embodiment may improve.

With reference to FIG. 7, this figure depicts a graph of the energy cost of another selection of checkpoints that an illustrative embodiment may improve. Graph 700 is a simplified plot of energy consumption 702 over time 704. Energy consumption according to graph 700 may result from, for example, an implementation of timeline 322 in FIG. 3.

A checkpoint taking begins at time 706 and completes at time 708. A failure occurs at time 710. Area 712 under graph 700 represents the energy consumed for taking the checkpoint between times 706 and 708. Note that area 712 may be smaller by comparison to area 612 in FIG. 6 for the same system when checkpoints are taken more frequently in FIG. 7 as compared to the frequency in FIG. 6.

Areas 714 and 716 under graph 700 each represent energy consumption due to earlier checkpoints that may have been taken. Area 718 under graph 700 represents the energy at risk from the failure, similar to area 616 in FIG. 6. However, because checkpoints are taken more frequently in FIG. 7 as compared to in FIG. 6, energy at risk is smaller in FIG. 7.

Checkpoint selection has a significant total cost. The illustrative embodiments recognize the energy cost of checkpoints as described with respect to FIGS. 3-7. In addition, the illustrative embodiments also recognize that almost any task, effort, resource, or material expended in selecting and taking checkpoints may be reduced to a cost. Thus, according to the illustrative embodiments, a total cost structure of selecting and taking checkpoints may include energy cost as described above, as well as any other factor reduced to a cost amount.

For example, a system administrator's time spent in restoring operation from a checkpoint may be reduced to a cost value. As another example, the number of processor cycles spent in such restoration can be reduced to a cost value as a portion of amortized cost of the data processing system.

As another example, the delay caused to another application executing on the data processing system when checkpoint is being taken can be reduced to a cost value. Such a cost value may correspond to the value of lost business or a fraction of the cost of adding additional data processing systems to keep up the application's performance. This cost value may also be a function of the opportunity cost that could be incurred if a failure occurs in the application. The opportunity cost can be variable, and this cost may vary accordingly.

Of course, the above examples are only described to clarify the method behind the illustrative embodiments. Any factor involved in the operation of a data processing environment may be reduced to a cost value in a similar manner. Thus, the illustrative embodiments propose incorporating energy costs and other factors reduced to cost amounts into the checkpoint selection process.

Figure 8:
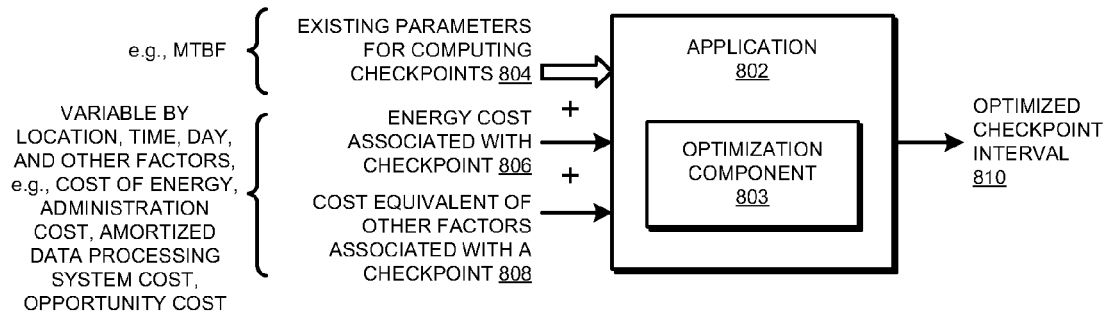
FIG. 8 depicts a block diagram of a system in which the illustrative embodiments may be implemented.

With reference to FIG. 8, this figure depicts a block diagram of a system in which the illustrative embodiments may be implemented. Application 802 may be a software application that computes when checkpoints should be taken based on total costs of checkpoints. Application 802 may be implemented as application 105 in FIG. 1. Application 802 may include optimization component 803. Optimization component 803 may implement an optimization algorithm, such as Monte Carlo simulation or an analytic solution, to optimize the computed checkpoint interval for any of the input factors or a combination thereof.

Application 802 may receive a set of parameters for computing the timing of and interval between the checkpoints. A set of parameters is one or more parameters. The set of parameters may include existing parameters 804 that are already being used in a data processing environment for computing checkpoints such as system's MTBF, the time needed to save a checkpoint, and the time needed to restore a checkpoint.

In accordance with an illustrative embodiment, application 802 may further accept information 806 about the energy costs associated with a checkpoint. The illustrative embodiments place no restrictions on the form or type of information 806, so long as application 802 can use information 806 to determine the energy costs associated with checkpoints. Various implementations of application 802 may prescribe differing forms for information 806 without departing from the scope of the illustrative embodiments.

Furthermore, application 802 may accept information 808. Information 808 includes information about cost equivalent of other factors associated with a checkpoint. Information 808 may include but is not limited to information about costs of task, effort, resource, or material expended in taking checkpoints as described above. For example, information 808 may include the variable cost of energy, the variable cost of administration, amortized data processing system cost, opportunity cost, and many other pieces of information. Any other factor not included in existing parameters 804 or energy cost information 806 may be included in information 808.

Application 802 may be implemented using any existing optimization algorithm. Many known optimization algorithms are commonly used in financial, scientific, and engineering computations. An implementation of application 802 may be based on any such algorithm that may be suitable for a particular implementation. For instance, a Monte Carlo simulation can be used to find the minimum cost of taking a checkpoint given a certain MTBF.

The illustrative embodiments describe energy costs and other example factors that should be used as inputs in such an algorithm. Application 802, having implemented an optimization algorithm of choice and having processed energy costs and other cost inputs there through, may produce output 810. Output 810 provides the selection of checkpoint times and intervals that are optimized with a total cost consideration.

In some instances, the optimization goal may place a greater weight on some factors as opposed to others. For example, application 802 can be so tuned that output 810 directs the selection of checkpoints to minimize the energy cost of taking checkpoints. In some other instances, application 802 may be so tuned that output 810 directs the selection of checkpoints to minimize delays of performance degradation of another application. Likewise, application 802 may be tuned within the scope of the illustrative embodiments to favor certain factors over another in selecting checkpoints.

Figure 9:
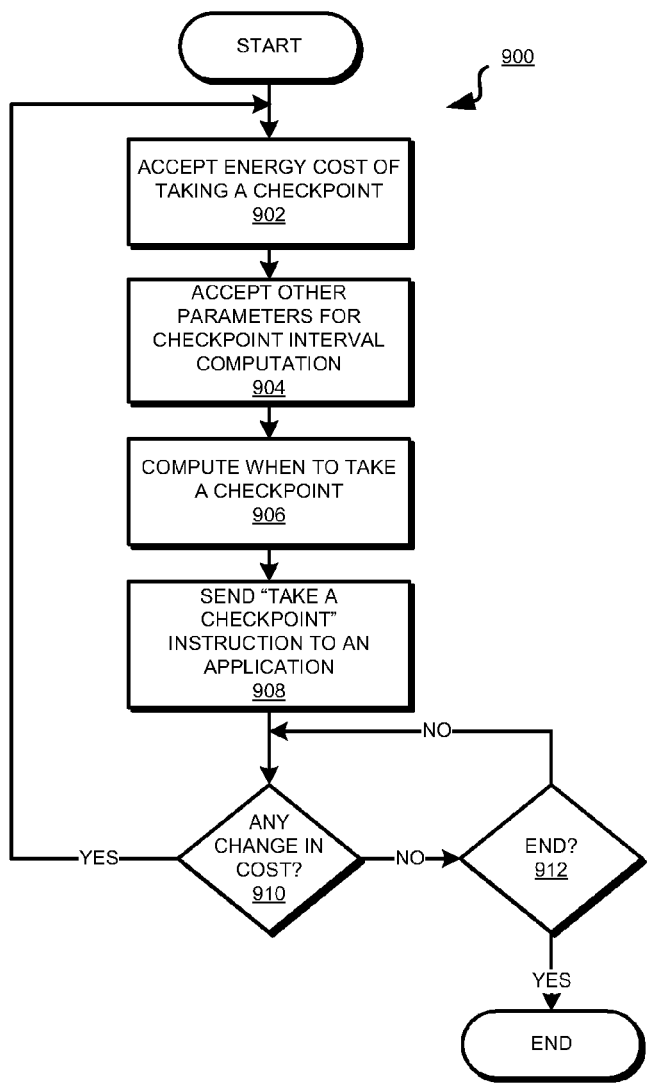
FIG. 9 depicts a flowchart of a process of taking a checkpoint in accordance with an illustrative embodiment.

With reference to FIG. 9, this figure depicts a flowchart of a process of taking a checkpoint in accordance with an illustrative embodiment. Process 900 may be implemented in application 802 in FIG. 8.

Process 900 begins by accepting information about the energy cost of taking a checkpoint (step 902). Energy cost of taking a checkpoint includes energy consumed in taking the checkpoint as described above with respect to FIGS. 6 and 7. Process 900 accepts other parameters to compute the checkpoint interval (step 904). Such other parameters may include the MTBF, cost of energy, cost system administrator, cost of application loss, and any other installation specific factor reduced to a cost value. Process 900 may compute the energy at risk as a part of computing the checkpoint interval. Energy at risk is as described with respect to FIGS. 6 and 7.

Process 900 may additionally accept any information relating to parameters presently being used in a data processing environment for computing checkpoints. Process 900 computes when a checkpoint should be taken based on the information received in steps 902 and 904 and any other existing parameters for taking checkpoints. Process 900 sends an instruction to take a checkpoint at a specified time or interval, or otherwise outputs information for taking such checkpoints (step 908).

Process 900 determines if any of the cost parameters, such as energy costs, amortized cost of the data processing system, administration costs, or other variable costs have changed (step 910). If process 900 determines that a cost parameter has changed ("Yes" path of step 910), process 900 returns to step 902 and re-computes the checkpoint interval.

If process 900 determines that cost parameters have not changed ("No" path of step 910), process 900 determines if process 900 should end (step 912). If process 900 determines that process 900 should continue ("No" path of step 912), process 900 returns to step 910. If process 900 determines that process 900 should end ("Yes" path of step 912), process 900 ends thereafter. Process 900 is described with respect only to energy cost consideration only for the clarity of the description. Energy cost is only one consideration in the total cost of checkpoint selection and is not limiting on the illustrative embodiments. Process 900 may similarly accept cost equivalents of any other one or more factors, such as by repeating steps 902 and 904 for each such factor.

The components in the block diagrams and the steps in the flowcharts described above are described only as examples. The components and the steps have been selected for the clarity of the description and are not limiting on the illustrative embodiments. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the illustrative embodiments.

Thus, a computer implemented method, apparatus, and computer program product are provided in the illustrative embodiments for total cost based checkpoint selection. Presently, the checkpoints are scheduled either at arbitrary intervals, or based on statistical probability of failure, but without the business consideration of cost of taking checkpoints. Using the illustrative embodiments, users configure checkpoints in a data processing environment such that the checkpoints are taken with consideration to the total cost associated with a checkpoint.

Particularly, taking one or more checkpoints such that the total energy cost of a checkpoint is minimized may be useful in a variety of environments. For example, cost of electrical power may vary during the day or seasons. Accordingly, a data center may be able to vary its checkpoint schedules using the illustrative embodiments and thereby reduce their electrical power consumption.

As another example, when a data center is distributed over a geographical area, cost of electrical power may be different in different geographical locations. Consequently, a distributed data center may apply different checkpoint schedules to different geographical locations to contain the cost of utilities.

As another example, when a data processing environment is operating on battery power during a power failure, conservation of electrical power may become an important consideration in the longevity of operation during the power outage. A smaller number of checkpoints as compared to the number of checkpoints during normal power operation may conserve energy. As another example, embedded systems may have access to limited amount of power and frequent checkpoints may deteriorate the energy performance of those systems.

The invention can take the form of an entirely hardware embodiment, an entirely software embodiment, or an embodiment containing both hardware and software elements. In a preferred embodiment, the invention is implemented in software, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for computing a checkpoint interval, the computer implemented method comprising:
   determining, in an application executing using a processor and a memory, a cost associated with taking a checkpoint, the cost including a cost of energy consumed in re-computing a computation lost due to a failure after taking the checkpoint;
   computing an interval between checkpoints to minimize the cost;
   sending an instruction to schedule the checkpoints at the computed interval; and
   taking the checkpoint according to the schedule, causing data representing status of a computer at a time of taking the checkpoint to be stored in a data storage device.

2. The computer implemented method of claim 1, wherein the energy cost further comprises a cost of energy consumed in collecting and saving data at a checkpoint.

3. The computer implemented method of claim 1, wherein the cost further comprises one of (i) an amount of administrator time consumed in recovering from a checkpoint, converted to a cost equivalent, (ii) an amount of computing resources expended in taking a checkpoint, converted to a cost equivalent, (iii) an amount of computing resources expended after a failure in restoring information from a checkpoint, and (iv) a performance degradation in the performance of an application while collecting and checkpoint saving checkpoint data, converted to a cost equivalent.

4. The computer implemented method of claim 1, wherein the computing uses an optimization algorithm, wherein the cost comprises a plurality of factors, and wherein the algorithm is configured to minimize a factor in the plurality of factors.

5. The computer implemented method of claim 1, wherein the cost changes based on one of (i) location, (ii) time of day, (iii) day of the year, and iv) a type of application executing at a time of failure.

6. The computer implemented method of claim 1, further comprising:
   re-computing the interval responsive to a change in the cost.

7. The computer implemented method of claim 6, wherein the change in the cost is a change in one of (i) the energy cost, (ii) an administration cost, (iii) an amortized cost of a data processing system, and (iv) an opportunity cost.

8. A computer usable program product comprising a computer usable medium including computer usable code for computing a checkpoint interval, the computer usable code comprising:
   computer usable code for determining a cost associated with taking a checkpoint, the cost including a cost of energy consumed in re-computing a computation lost due to a failure after taking the checkpoint;
   computer usable code for computing an interval between checkpoints to minimize the cost;
   computer usable code for sending an instruction to schedule the checkpoints at the computed interval; and
   computer usable code for taking the checkpoint according to the schedule, the computer usable code for taking the checkpoint causing data representing status of a computer at a time of taking the checkpoint to be stored in a data storage device.

9. The computer usable program product of claim 8, wherein the energy cost further comprises a cost of energy consumed in collecting and saving data at a checkpoint.

10. The computer usable program product of claim 8, wherein the cost further comprises one of (i) an amount of administrator time consumed in recovering from a checkpoint, converted to a cost equivalent, (ii) an amount of computing resources expended in taking a checkpoint, converted to a cost equivalent, (iii) an amount of computing resources expended after a failure in restoring information from a checkpoint, and (iv) a performance degradation in the performance of an application while collecting and checkpoint saving checkpoint data, converted to a cost equivalent.

11. The computer usable program product of claim 8, wherein the computer usable code for computing includes computer usable code for an optimization algorithm, wherein the cost comprises a plurality of factors, and wherein the algorithm is configured to minimize a factor in the plurality of factors.

12. The computer usable program product of claim 8, wherein the cost changes based on one of (i) location, (ii) time of day, (iii) day of the year, and iv) a type of application executing at a time of failure.

13. The computer usable program product of claim 8, further comprising:
computer usable code for re-computing the interval responsive to a change in the cost.

14. The computer usable program product of claim 13, wherein the change in the cost is a change in one of (i) the energy cost, (ii) an administration cost, (iii) an amortized cost of a data processing system, and (iv) an opportunity cost.

15. A data processing system for computing a checkpoint interval, the data processing system comprising:
a storage device including a storage medium, wherein the storage device stores computer usable program code; and
a processor, wherein the processor executes the computer usable program code stored on the storage device, and wherein executing the computer usable program code performs a method comprising;
determining a cost associated with taking a checkpoint, the cost including a cost of energy consumed in re-computing a computation lost due to a failure after taking the checkpoint;
computing an interval between checkpoints to minimize the cost;
sending an instruction to schedule the checkpoints at the computed interval; and
taking the checkpoint according to the schedule, causing data representing status of a computer at a time of taking the checkpoint to be stored in a data storage device.

16. The data processing system of claim 15, wherein the energy cost further comprises a cost of energy consumed in collecting and saving data at a checkpoint.

17. The data processing system of claim 15, wherein the cost further comprises one of (i) an amount of administrator time consumed in recovering from a checkpoint, converted to a cost equivalent, (ii) an amount of computing resources expended in taking a checkpoint, converted to a cost equivalent, (iii) an amount of computing resources expended after a failure in restoring information from a checkpoint, and (iv) a performance degradation in the performance of an application while collecting and checkpoint saving checkpoint data, converted to a cost equivalent.

18. The data processing system of claim 15, wherein the computing includes computer usable code for an optimization algorithm, wherein the cost comprises a plurality of factors, and wherein the algorithm is configured to minimize a factor in the plurality of factors.

19. The data processing system of claim 15, wherein the cost changes based on one of (i) location, (ii) time of day, (iii) day of the year, and iv) a type of application executing at a time of failure.

20. The data processing system of claim 15, further comprising:
re-computing the interval responsive to a change in the cost, wherein the change in the cost is a change in one of (i) the energy cost, (ii) an administration cost, (iii) an amortized cost of a data processing system, and (iv) an opportunity cost.

* * * * *